US006120678A

United States Patent [19]

Stephenson et al.

[11] Patent Number: 6,120,678

[45] Date of Patent: Sep. 19, 2000

[54] DESALTING ADJUNCT CHEMISTRY

[75] Inventors: William K. Stephenson, Sugar Land; Joe Scott Walker, Missouri City, both of Tex.; Bordan W. Krupay; Sheraldean A. Wolsey-Iverson, both of Alberta, Canada

[73] Assignee: Nalco Chemical Company, Naperville, Ill.

[21] Appl. No.: 08/132,166

[22] Filed: Oct. 5, 1993

Related U.S. Application Data

[63] Continuation of application No. 07/743,663, Aug. 12, 1991, abandoned.

[51] Int. Cl.$^7$ .......................... C10G 33/04; B01D 21/01; C09K 3/00; E21B 21/00

[52] U.S. Cl. ..................... 208/188; 208/251 R; 210/708; 210/732; 204/563; 204/567; 507/220; 507/224; 507/225

[58] Field of Search ..................................... 210/708, 732; 208/188, 251 R, 370; 252/331; 516/171, 183; 507/220, 224, 225, 921; 204/563, 567, 569, 573

[56] References Cited

U.S. PATENT DOCUMENTS

| | | | |
|---|---|---|---|
| 4,551,239 | 11/1985 | Merchant et al. | 208/188 |
| 4,737,265 | 4/1988 | Merchant, Jr. et al. | 208/188 |
| 5,021,498 | 6/1991 | Stephenson et al. | 524/484 |
| 5,032,285 | 7/1991 | Braden et al. | 210/708 |
| 5,073,248 | 12/1991 | Stephenson et al. | 208/22 |
| 5,100,531 | 3/1992 | Stephenson et al. | 208/22 |
| 5,143,594 | 9/1992 | Stephenson et al. | 208/48 AA |

*Primary Examiner*—Mark L. Bell
*Assistant Examiner*—Patricia L. Hailey
*Attorney, Agent, or Firm*—Margaret M. Brumm; Thomas M. Breininger

[57] ABSTRACT

Improved performance in the phase separation of aqueous brines from hydrocarbons within an electrostatic desalter operation is obtained by the addition to the crude oil emulsions entering the desalter of an effective asphaltene dispersing amount of an alkyl phenol-formaldehyde liquid resin polymer, optionally in the presence of a lipophilic/hydrophilic vinylic polymer. The preferred resin is a nonyl phenol-formaldehyde resin having a molecular weight of from 1,000–20,000, and the preferred vinylic polymer is a copolymer of lauryl (meth)acrylate and hydroxyethyl (meth) acrylate. Best results from the electrostatic desalter are obtained when also using a demulsifier chemical treatment along with the asphaltene dispersing treatments. Desalter efficiency is increased and desalter brine effluent quality is greatly increased.

8 Claims, No Drawings

DESALTING ADJUNCT CHEMISTRY

This is a Continuation of application Ser. No. 07/743,663 filed on Aug. 12, 1991, now abandoned.

INTRODUCTION

Raw crude oils contain hydrocarbons, but also contain water soluble salts, such as sodium chloride, magnesium and calcium chlorides, sulfates, and other such salts, insoluble salts and other solids, both inorganic and organic, and water, and is normally recovered from underground formations in terms of emulsions containing these ingredients. The hydrocarbon portion of raw crude oil may contain a number of different species including but not limited to aliphatics, olefinics, aromatics, cyclics, aralkyls, alkaryls, naphthas, condensed cyclics, and asphaltenes, and the like. Proportions of each ingredient varies dependent upon the source of the crude oil, but invariably the crude oils also contain waters, and inorganic salts, such as sodium chloride, potassium chloride, magnesium and calcium chlorides and such other sodium, potassium and calcium salts, magnesium salts, and the like.

Raw crude oil entering the refinery may contain up to 5% water containing dissolved salts (Na, Mg, Ca). The emulsified water in crude oil is typically stored in tanks prior to entering actual refinery process. One such refinery operation is referred to as a desalting unit. These desalting units normally operate on the basis of the imposition on the raw crude oil and wash water of an electrical field of high voltage and low current.

These raw crude oil emulsions, prior to further processing, are normally washed with waters and put through an operation or operations in most refineries to remove water, brines, salts, suspended solids and the like before the crude oil enters the refinery. One such operation is referred to as a desalting unit. These desalting units normally operate on the basis of the imposition on the crude oil or on a water washed crude oil (a so called crude oil wash water emulsion) of an electrical field of high voltage and low current, which voltage can range from 300 volts to as high as 30,000 volts, but normally ranges between about 1,000 to about 25,000 volts. The voltage is applied to the crude oil wash water emulsion between two sheltered electrodes using an alternating signal applied to a direct applied voltage which effects the interphase of the crude oil emulsion droplets causing them to coalesce, thereby encouraging phase separation of the water, water soluble salts dissolved in the water, and the crude oil hydrocarbons.

Exemplary, but not exhaustive in their teachings, of such electric desalters are the teachings found in U.S. Pat. No. 3,582,489, Meadow, et. al.; U.S. Pat. No. 3,701,723, Cole, et. al.; and U.S. Pat. No. 3,252,884, Martin, et. al., all of which are incorporated herein by reference.

In a normal operation of the desalting unit as described above, the interface between the crude oil hydrocarbons and the aqueous salt brines collects solid materials, such as insoluble inorganic salts and insoluble organics in a so-called “rag” interface accumulation. If this interface accumulation or “rag” becomes too great, the effectiveness of the desalter may be diminished or lost and the ability to remove inorganic salts and water (brines) from the raw crude oil emulsions is diminished.

To assist in these desalter operations, it is common to add chemicals, which are known as demulsifiers. Exemplary of such demulsifiers are the teachings of U.S. Pat. Nos. 2,154,423; 2,498,656; 2,499,360; and 4,175,054, all of which are incorporated herein by reference. These demulsifiers can contain numerous chemistries some of which will be described later. Normally, these demulsifiers have no effect on the “rag” formation particularly they have no effect on the amount of asphaltenes which often comprise some or a major portion of this “rag”. When the asphaltenes become predominant, they have a tendency to accumulate and foul the desalter interface and accumulate on the surfaces of the desalter and other downstream processing units. The “rag” is preferably dumped with the brine streams, and when this is done, the effluent brine contains heavy hydrocarbon loads creating a difficult environmental treatment problem.

Therefore, it would be an advance in the art if one could treat the original crude oil wash water emulsions formed in the desalting process to provide for enhanced separation of water, brackish solutions of salts, the brines containing salts of sodium, magnesium and calcium chlorides, and the crude oil hydrocarbons, including the asphaltenes, so as to provide for a lessened or decreased amount of the “rag” layer and enhanced performance of the desalter in terms of salt removal, solids removal, dehydration and throughput rates. Also if improved separation of water and salts from crude oil hydrocarbons in a desalter unit is improved, the effluent brines would be cleaner and an environmental risk decreased.

Certain materials similar to the materials used in this invention are known as asphaltene dispersants and inhibitors and are described in U.S. Pat. No. 5,021,498, which patent is incorporated herein by reference. These polymers are taught to be useful as dispersants of asphaltenes in various hydrocarbons chosen from the group consisting of petroleum oils, crude oils, and various hydrocarbon fractions thereof. The method of treating these hydrocarbons containing asphaltenes comprises the addition of the polymers described in the U.S. Pat. No. 5,021,498 patent to the hydrocarbon thereby dispersing the asphaltenes therein.

Although this patent teaches generally a method of dispersing and maintaining fluidity of asphaltene fractions in hydrocarbons, there is no specific mention of the benefits derived by adding these polymers or similar polymers in admixture to crude oils or crude oil wash water emulsions prior to their being introduced into an electric desalter, and the improvements in the operation of the electric desalter as a result of treating said crude oil emulsions containing asphaltenes prior to, or simultaneously with, imposition of electric fields as imposed in an electric desalter.

OBJECTS OF THE INVENTION

It is, therefore, an object of the invention to treat crude oil emulsions with a treating agent that enhances the separation of water and inorganic chloride salts from crude oil hydrocarbons, including asphaltenes, and diminishes the rag which forms at the interface between the salt solutions and the crude oil hydrocarbons in electric desalters.

It is a further object of this invention to treat the crude oil emulsions with an effective emulsion destabilizing and breaking and asphaltene dispersing amount of an alkyl phenol-formaldehyde polymer, said treatment deriving, in the electric desalter operation, a cleaner interface, a more rapid separation of water from hydrocarbon fractions contained in the crude oil emulsions, and an improved interface "rag" content in the electric desalter by said treatment.

It is a further object of this invention to enhance the treatment of crude oil emulsions with known Demulsifiers by providing a secondary treatment comprising adding the polymeric alkyl phenol-formaldehyde polymers, optionally with a vinylic polymer described as a hydrophilic lipophilic vinylic polymer, which vinylic polymer may be added in additional effective amounts to obtain further improvements in the operation of an electric desalter separating water and brackish chloride salts of Na, K, Mg and Ca, and the like from crude oil hydrocarbons.

It is finally an object of this invention to treat crude oil emulsions containing water, brackish chloride salts, and other water soluble salts, as well as, insoluble salts, asphaltenes with effective amounts of a demulsifier along with an alkyl-substituted phenol-formaldehyde polymer, optionally in the presence of a second hydrophilic lipophilic vinylic polymer, wherein the ratio of the alkyl phenol-formaldehyde polymer to the hydrophilic lipophilic vinylic polymer ranges from 100 percent alkyl phenol-formaldehyde polymer, to about 10 percent alkyl phenol-formaldehyde polymer, and from about 0 percent hydrophilic hydrophobic vinylic polymer to about 90 percent hydrophilic hydrophobic vinylic polymer.

It is further an object of this invention to treat the crude oil emulsions or crude oil wash water emulsions with a combination of polymers, which combination includes demulsifiers, such as the alkoxylated alkyl phenol-formaldehyde resins, and the asphaltene dispersing alkyl phenol-formaldehyde polymers, ratioed in the range of 90:10 to about 10:90 with a second polymer described herein as a hydrophilic hydrophobic vinylic polymer, to obtain improved electric desalter operation. It is further an object of this invention to simultaneously treat crude oil emulsions in an electric desalter, either prior to or simultaneously with entering the electric desalter, with the demulsifier and an alkyl phenol-formaldehyde polymer, optionally in the presence of a hydrophilic hydrophobic vinylic polymer.

THE INVENTION

Our invention is an improved method of obtaining the separation of water and brackish chloride salts of Na, K, Ca, and Mg, as well as other water soluble salts, from crude oil hydrocarbons, including asphaltenes, which method comprises treating a crude oil emulsion or crude oil wash water emulsion containing the above ingredients prior to exposure to an electric field in an electric desalter, with an effective emulsion destabilizing and asphaltene dispersing amount of an alkyl phenol-formaldehyde polymer having the structure:

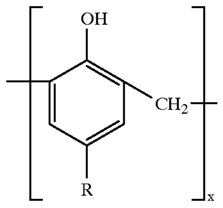

wherein R is a linear or branched alkyl group having from 4–24 carbons, and x is an integer of sufficient value to provide for a liquid resin having a molecular weight of from 1,000 to about 20,000.

Our improved method of obtaining separation of water and brackish chloride salts from crude oil hydrocarbons, including the asphaltenes, also provides for improved operation of the electric desalter in that the "rag" layer that normally forms between the hydrocarbon fraction and the salt solutions during and after the desalting operation is diminished, and this interfacial "rag" layer is particularly diminished in terms of lowering the content of asphaltenes normally found in this "rag" layer. The results of practicing our method of operating the electric desalter is particularly enhanced when the alkyl phenol-formaldehyde resins described above are used in admixture with a second polymer having the structure:

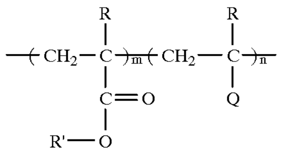

wherein

R is chosen, at each occurrence, from hydrogen and methyl groups; and

R' is a hydrocarbonaceous group containing from 4–24 carbon atoms and chosen from linear or branched alkyl groups, aromatic, cyclic, alkaryl, aralkyl groups, and mixtures thereof; and Q is chosen from the groups,

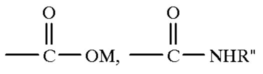

and mixtures thereof; and M is chosen, at each occurrence, from the group hydrogen, alkali metal cations, alkaline earth metal cations, ammonium ions, protonated amines, quaternary amines, hydroxyl ethyl, hydroxy propyl and

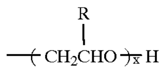

groups, and mixtures thereof; and R" is chosen, at each occurrence, from the group $$-\left(CH_2\overset{R}{\overset{|}{C}}HO\right)_x H, \quad -(CH_2)_{1\text{-}2\text{-}3}-\overset{O}{\overset{\|}{C}}OM$$

and mixtures thereof; and m and n are both integers of sufficient number to achieve a weight average molecular weight ranging from about 5,000–250,000, and being of such a ratio as to describe the presence of from 90 to 10 weight percent of the lipophilic monomer, m, and from 10 to 90 weight percent of the hydrophilic monomer, n, and wherein x ranges from 1 to 20.

Normally, improved desalting in the electric desalter is observed with the use of the alkyl phenol-formaldehyde polymers described above when R is a linear or branched alkyl group having from 4–16 carbon atoms, preferably from 6–12 carbon atoms, and most: preferably between about 6–10 carbon atoms. The nonyl phenol-formaldehyde resins are most preferably used. The molecular weight of our alkyl phenol-formaldehyde liquid resin polymer normally ranges between a weight average molecular weight of about 1,000 to about 20,000, preferably from about 2,000 to about 18,000, and most preferably from about 5,000 to about 15,000. The best use is of the nonyl phenol formaldehyde resins having molecular weight ranging from about 6,000 to about 10,000, said resins being formed by equimolar reaction of alkyl phenol and formaldehyde, either with acid or base catalysts.

After the crude oil emulsion is treated with our alkyl phenol-formaldehyde liquid polymer, this material is exposed to normal conditions in a desalter which conditions can include temperatures ranging from about 80° F. to about 330° F., electric voltage ranging from about 300 volts to about 30,000 volts, or higher, sometimes as high as 50,000 volts, and exposure times ranging from about 1 minute to about 1 hour. The electric desalters may operate on a batch process, on a semi-batch basis, or on a continuous basis, and the water mixtures obtained from the desalter are normally wasted or discarded as long as the hydrocarbon values are sufficiently low. The hydrocarbons from the electric desalters are recovered and further processed as known in the art in the refining of crude oil.

The addition of our alkyl phenol-formaldehyde polymers, which polymers are normally liquid at room temperature and have a molecular weight as described above, is such that from 1 to about 10,000 parts per million of the alkyl phenol-formaldehyde polymer is used to treat the crude oil emulsion prior to or simultaneously with exposure of these crude oil emulsions to the desalter operation. In the operation of the desalter, water may additionally be added prior to or during the desalter operation. This additional water, so called "wash water", can enhance the operation of the desalter and the added wash water can be equal to about 1 volume percent to about 10 volume percent of the total volume of the crude oil emulsion added to the desalter. Normally, the water added to the crude oil emulsion entering the desalter ranges between about 2 volume percent to about 10 volume percent of the crude oil being added to the desalter, and the emulsion containing this wash water is referred to herein as crude oil wash water emulsion.

When using our optional hydrophilic/hydrophobic vinylic polymer, this polymer has the structures described above, where R is individually chosen, at each occurrence, from hydrogen or methyl groups, R' is preferably a linear or branched alkyl group containing from 6–18 carbon atoms, most preferably containing from about 8 to about 16 carbon atoms, and Q is preferably chosen from the group consisting of carboxylate acids, salts thereof, or the hydroxyalkyl esters thereof, amides or substituted amides and mixtures thereof. The molecular weight of these vinylic polymers ranges preferably from about 10,000 to about 100,000, preferably from about 10,000 to about 80,000.

The ratios of the phenol-formaldehyde polymers to the hydrophilic/hydrophobic vinylic polymers normally ranges from about 100 to 10 weight percent phenol-formaldehyde polymer and from about 0 to 90 weight percent of the second hydrophilic/hydrophobic polymer.

The hydrophilic/hydrophobic vinylic polymer preferably contains from 90-10 weight percent of the lipophilic monomer represented by m and from about 10 to 90 weight percent of the hydrophilic monomer represented by n. However, the preferred ratio of lipophilic monomer to hydrophilic monomer ranges from about 70:30 to about 30:70. The most preferred weight ratios of lipophilic monomer to hydrophilic monomer in the lipophilic/hydrophilic vinylic polymers is from 60:40 to 40:60 as described above. These vinylic polymers are most preferably copolymers of lauryl (meth)acrylate and hydroxy alkyl (meth)acrylate monomers.

Effective Concentrations

The effective concentrations of the alkyl phenol-formaldehyde polymer in obtaining the improved separation of water and brackish chloride brines from crude oil hydrocarbons, including asphaltenes, when treating crude oil emulsions prior to electric desalter operation normally ranges from about 1 part per million to about 10,000 parts per million of the alkyl phenol-formaldehyde resin, based on the total amount of crude oil emulsion treated. The preferred range of treatment is from about 2.5 to about 1,000 parts per million of this phenol-formaldehyde liquid resin, again based on the crude oil treated.

The most preferred concentrations normally range from about 2.5 parts per million to about 500 parts per million of the phenol-formaldehyde resin, again based upon the crude oil treated.

When the combination polymer is used, the preferred concentrations for the phenol-formaldehyde resin are as above, and these concentrations may be admixed with the second hydrophilic/hydrophobic vinylic polymers to meet the ratios as described above. When using the combination of treatment polymers, the preferred combination is one that contains from about 95 to about 50 weight percent of the alkyl phenol-formaldehyde resin and from about 50 to about 5 weight percent of the hydrophilic/hydrophobic polymer, such that the crude oil emulsion is treated so as to contain from 2.5 to about 500 parts per million, based on the crude oil treated of the phenol-formaldehyde resin.

As earlier mentioned, other emulsion breaking compounds known as demulsifiers can also be used to treat these crude oil emulsions. These compounds include, but are not limited to the alkoxylated, alkyl phenol-formaldehyde resins; diacid, diester fatty acids esterified with polyols, polyglycols, and the like; alkoxylates of fatty or aromatic acids or fatty or aromatic alcohols, mixed alkoxylates of long chain fatty alcohols/fatty diacids, and admixtures thereof, as well as admixtures with polyisobutylenes or other adjunct demulsifier adducts.

The Liquid Alkyl Phenol-Formaldehyde Resins

The liquid alkyl phenol-formaldehyde resins are those described above. Preferably, the alkyl group substituted on the phenol aromatic ring is one that contains from 6 to 12 carbons and the substitution is para to the alcohol substituent. The alkyl substituent may, however, be ortho substituted, or mixed ortho and para and is linear alkyl or branched alkyl substituent. If the alkyl group is attached at the ortho position, then the polymer chain is through the para position and not the ortho position as designated in the representative drawings above. The weight average molecular weight of these liquid resins preferably ranges between about 2,000 to about 15,000 and most preferably the molecular weight ranges between about 5,000 to about 12,000. The resins may be linear, branched, or even cross-linked, but when branched or cross-linked, the resins must have only sufficient branching or crosslinking so as to remain liquid at temperatures within the range of 10° C. to around 200° C. Preferably, these resins are able to be suspended or dissolved in any inert hydrocarbon solvents, such as hexane, benzene, toluene, aromatic naphthas, and the like. They may also be formulated in crude oil fractions, such as naphtha, heavy aromatic naphthas, mineral oils, and the like.

The most preferred alkyl-substituted alkyl phenol-formaldehyde resins are those liquid resins derived from an acid catalyzed or base catalyzed reaction of from 1:1.5 to 1.5:1 mole ratio of a $C_6$–$C_{12}$ alkyl substituted phenol and formaldehyde. Most preferably these liquid resins are obtained from reacting nonyl phenol and formaldehyde in about equimolar amounts so as to obtain a liquid resin having a weight average molecular weight between about 2,000 and about 8,000. The reaction can be done in neutral solvents, such as toluene, heavy aromatic naphthas, and the like.

The Lipophilic/Hydrophilic Vinyl Polymers

The lipophilic/hydrophilic second polymer can enhance the operation of the desalting unit by increasing the dispersion of asphaltenes into the hydrocarbon phase, decreasing the amount of "rag" separating the hydrocarbon phase from the aqueous salt brine phase and increasing the rate at which the hydrocarbon phases separate from the aqueous salt brine solutions in the desalter. These hydrophilic lipophilic polymers are preferably vinylic polymers having a weight average molecular weight ranging between about 5,000 to about 250,000 and containing monomer units, which are either repeating or randomly distributed in the polymer backbone which monomer units are derived from the hydrophilic and lipophilic monomers described below.

The lipophilic monomers are primarily those monomers chosen from the group consisting of acrylate or methacrylate fatty esters, i.e. where acrylic or methacrylic acid has been esterified using a fatty alcohol chosen from an alcohol containing from $C_4$–$C_{24}$ carbon groups, thereby leading to an acrylate or methacrylate ester where the ester functionality contains hydrocarbonaceous substituents including linear and branched alkyl substituents, aromatic, cyclic, alkaryl, aralkyl substituents or mixtures thereof; and where the hydrocarbonaceous groups of the ester (meth)acrylates contain from 4–24 carbon atoms.

Preferably these fatty ester acrylates or methacrylates (abbreviated as (meth)acrylates) are those esters which are derived from alcohols containing from 8–16 carbon atoms, and preferably are those alcohols, such as lauryl alcohol and the like. The most preferred lipophilic monomer used to form the hydrophilic-lipophilic vinyl polymers is lauryl acrylate.

These lipophilic monomers are polymerised with a vinylic hydrophilic monomer, which hydrophilic monomer is chosen from acrylic acid or methacrylic acid, and their organic or organic salts, and the non-fatty acrylate or methacrylate esters, where the ester functionality contains a polar unit, such as an alcohol, amine, carboxylic acid, amide, quaternary nitrogen salt, and the like. These hydrophilic vinylic monomers are primarily those monomers chosen from acrylic acid, methacrylic acid, (abbreviated as (meth)acrylic acid), acrylamide, methacrylamide, (abbreviated as (meth) acrylamide) , hydroxyethylacrylate, hydroxypropylacrylate, and the like. The most preferred hydrophilic monomers are hydroxyethylmethacrylate, hydroxypropylacrylate, or mixtures thereof.

This hydrophilic-lipophilic vinyl polymer (H-LVP's) contains from about 90 weight percent to about 10 weight percent of the lipophilic monomer and about 10 weight percent to about 90 weight percent of the hydrophilic monomer. Preferably, these H-L V Ps contain about 90-50 weight percent of the lipophilic monomer and 10–50 weight percent of the hydrophilic monomer. However, the most preferred polymers contain a ratio of about 70 weight percent lipophilic monomer and about 30 weight percent hydrophilic monomer/An ratio between the ranges of about 10:1 to about 1:10 can function in the invention.

These H-L V Ps are copolymers which can contain at least one or more of both of the above described hydrophilic and lipophilic monomer units, and are polymers which have molecular weights ranging from about 5,000 up to about 250,000, preferably between about 10,000 up to about 150,000, and most preferably are those polymers which have a weight average molecular weight ranging between about 15,000–100,000. The most preferred hydrophilic-lipophilic vinylic polymer, which may also be used by itself, or in combination with the alkyl phenol-formaldehyde resins described above, are H-L V Ps derived from lauryl acrylate and hydroxyethylmethacrylate, which polymers contain from about 80 to about 30 weight percent lauryl acrylate and from about 20 to about 70 weight percent hydroxyethylmethacrylate, but preferably contain 70% lauryl acrylate and 30% HEMA. These lauryl acrylate/hydroxyethylmethacrylate H-L V Ps have a molecular weight normally ranging between about 10,000–150,000, and preferably between about 15,000–100,000, and most preferably between about 20,000–80,000. In all cases, where molecular weight is referred to in this application, it is in terms of weight average molecular weight.

The Combinations of Polymer

The alkyl phenol-formaldehyde resins and the hydrophilic lipophilic polymers described above may be used alone in treating these crude oil emulsions prior to entering the desalter, either alone as the alkyl phenol-formaldehyde resins or in combinations thereof with the hydrophilic lipophilic vinyl polymers. When combinations are used, the combinations can include from 100 percent alkyl phenol-formaldehyde liquid resin and 0 percent hydrophilic lipophilic vinylic polymer to about 5 percent alkyl phenol-formaldehyde liquid resin and 95 percent hydrophilic-lipophilic vinylic polymer. Preferably our two polymers are used in admixture containing front 95 to about 10 percent of the alkyl phenol-formaldehyde liquid resin and from about 5 to about 90 percent of the hydrophilic lipophilic vinylic polymers. These admixtures are particularly useful when added to the crude oil emulsions prior to or simultaneously with the addition of demulsifiers to the crude oil emulsions entering the electric desalter. In combination with our polymers, the used demulsifier additives improve the desalter results. The liquid phenolic resin obtained by reacting equal moles of an alkyl phenol containing from 8 to 10 carbon units in the alkyl substituent group and formaldehyde with a molecular weight ranging between about 1,000 to about 10,000 is particularly preferred. These materials may be admixed with the hydrophilic lipophilic vinylic polymer, which polymer preferably is the lauryl acrylate (70%)-hydroxyethylmethacrylate (30%) polymer above. The most preferred and best mode of practicing our invention is to treat the crude oil emulsions immediately prior to their exposure to high voltage in a electric desalter normally used in separating water brines and salts from hydrocarbon fractions in crude oil emulsions by adding from about 2.5 to about 1,000 parts per million, based on hydrocarbon materials treated, of a treatment formulation which uses from about 60–100 weight percent of a nonyl phenol-formaldehyde liquid resin having a molecular weight ranging from about 4,000 to about 12,000 and from about 0 to 40 weight percent of a hydrophilic-lipophilic vinylic polymer, which hydrophilic lipophilic polymers contains from 80-30 weight percent lauryl acrylate and from about 20–70 weight percent hydroxyethylmethacrylate. The preferred molecular weight of this hydrophilic-lipophilic vinylic polymer ranges between 15,000 to about 100,000 and the most preferred molecular weight ranges from about 20,000 to about 80,000. The crude emulsions may be also treated with demulsifiers, at concentrations of from 1–10,000 ppm and with from about 1–10 volume % water, then admixed before or as they enter the electric desalter. The alkyl phenol-formaldehyde resins and H-L VP were tested alone and in combination with a series of demulsifier components to determine their impact on the emulsion breaking process.

To exemplify the use of our treatment agents in a desalter, the following examples are given:

EXAMPLES

A portable electric desalter was used for laboratory evaluations of our formulations. Standard emulsion breaking chemistries also used commercially were simultaneously applied to the raw crude oils prior to entering the portable electric desalter. The portable electric desalter was capable of applying an electric field of approximately 3,000 volts, which voltage was used during these laboratory tests. Table 1 provides the results in terms of the accumulated amount of water dropped out of the treated raw crude oil when using various standard de-emulsifiers normally used in conjunction with electric desalters, with or without our asphaltene dispersants.

In Table 1, 650 milliliters of a crude oil from a Texas refinery was admixed with 32.5 milliliters of water and stirred for 15 seconds, then heated to 150° F. The heating was done in an electrically heated block prior to the electrodes of the portable electric desalter being immersed in the crude oil emulsion, Demulsifiers were added at the treatment levels indicated.

TABLE 1*

| | | | TREATMENT TEMPERATURE = 150° F. | | | |
|---|---|---|---|---|---|---|
| TUBE# - TREATMENT | Dose, ppm | 10 min | 1 min 3,000V | 1 min 3,000V | 30 min | 40 ml |
| 1 #1 | 12 | 0.15 ml | 0.6 ml | 2.0 ml | 2.9 ml | 2.9 ml |
| 2 #2 | 12 | 0.10 ml | 0.4 ml | 0.7 ml | 1.5[B] | 2.0 ml |
| 3 #3 | 12 | TR ml | 0.3[B] | 1.8 ml | 2.4 ml | 2.7 ml |
| 4 #4 | 12 | 0 ml | 0 ml | TR | TR | 0.05 ml |
| 5 #1 + #4 | 12 + 12 | 0.1 | 1.5 ml | 2.7 ml | 2.8 ml | 2.9 ml |
| 6 #5 | 12 | 0.15 ml | 0.5[B] | 1.3 ml | 1.4 ml | 1.7 ml |
| 7 #6 | 12 | 0.15 ml | 0.8 ml | 2.2 ml | 2.6 ml | 2.8 ml |
| 8 Blank | 0 | 0 ml | 0 | 0 | TR | TR |
| 9 Blank | 0 | 0 ml | TR | TR | TR | TR |
| 10 #1 | 12 | 0.3 ml | 0.5 ml | 1.1 ml | 2.3 ml | 2.8 ml |
| 11 #1 - #4 | 12 + 12 | 0.3 ml | 1.0 ml | 2.0 ml | 2.7 ml | 2.8 ml |
| 12 #7 | 12 | 0.2 ml | 0.5 ml | 2.2 ml | 2.3 ml | 2.8 ml |
| 13 #7 - #4 | 12 + 12 | 0.05 ml | 0.7 ml | 2.5 ml | 2.6 ml | 2.7 ml |
| 14 #8 | 12 | 0.04 ml | 0.4 ml | 0.4 ml | 0.04 ml | 0.5 ml |
| 15 #9 | 12 | 0.3 ml | 1.7 ml | 2.6 ml | 2.8 ml | 3.1 ml |
| 16 #10 | 12 | 0.15 ml | 0.3 ml | 0.45 ml | 1.8 ml | 2.3 ml |

*Gulf Coast Texas Refinery Raw Crude; 650 ml + $H_2O$; stirred & heated to 150° F.
TR means trace,-i.e. less than 0.05 ml water settled out.

In a separate test, a raw crude oil from a Texas Gulf Coast refinery was treated with a demulsifier, only the nonyl phenol-formaldehyde liquid resin of this invention, and admixtures of demulsifier and liquid resin. The results are below:

| | | 170° F. | | | |
|---|---|---|---|---|---|
| Treatment | Dose, ppm | 1 min 3,000V | 1 min 3,000V | 15 min | 15 min |
| #3 | 30 | 0.5 ml | 0.8 ml | 2.0 ml | 3.0 ml |
| #3 + #12 | 30 + 30 | 1.0 ml | 3.5 ml | 4.1 ml | 4.3 ml |
| Blank | — | TR | TR | 1.0 ml | 2.0 ml |
| #12 | 30 | 0.1 ml | 0.2 ml | 1.5 ml | 2.0 ml |

TABLE II*

| TUBE - TREATMENT | | Dose, ppm | 1 min 3,000V | 1 min 3,000V | 15 min 170 F | 15 min 170 F |
|---|---|---|---|---|---|---|
| 1 | #3 | 30 | 0.5 ml | 0.8 ml | 2.0 ml | 3.0 ml |
| 2 | #3 + #4 | 30 + 10 | 1.0 ml | 2.75 ml | 2.5 ml | 3.5 ml |
| 3 | #2 | 30 | 0.5 ml | 1.0 ml | 1.6 ml | 2.0 ml |
| 4 | #2 + #4 | 30 + 10 | 0.5 ml | 1.2 ml | 1.8 ml | 2.7 ml |
| 5 | #1 | 30 | 0.75 ml | 1.4 ml | 2.0 ml | 2.2 ml |
| 6 | #1 + #4 | 30 + 10 | $0.40^B$ | 1.0 ml | 1.5 ml | 2.0 ml |
| 7 | #11 | 30 | 0.10 ml | 0.10 ml | 1.3 ml | 1.5 ml |
| 8 | #11 + #4 | 30 + 10 | 0.10 ml | 0.4 ml | 1.2 ml | 2.0 ml |
| 9 | #3 | 30 | $0.5^B$ | 1.0 ml | 2.2 ml | 3.0 ml |
| 10 | #3 + #4 | 30 + 10 | 0.5 ml | 1.5 ml | 3.0 ml | 3.5 ml |
| 11 | #3 | 20 | $0.5^B$ | 1.5 ml | 2.5 ml | 3.2 ml |
| 12 | #3 + #4 | 20 + 10 | 0.3 ml | 1.0 ml | 2.6 ml | 3.5 ml |
| 13 | #12 | 30 | 0.8 ml | 1.5 ml | 2.3 ml | 2.5 ml |
| 14 | #12 | 20 | 0.25 ml | 0.5 ml | 1.4 ml | 1.7 ml |
| 15 | #2 + #4 | 30 + 10 | 0.4 ml | 0.8 ml | 1.5 ml | 2.3 ml |
| 16 | #2 + #4 | 20 + 10 | 0.1 ml | $0.6^B$ | 1.4 ml | 2.2 ml |

*West Texas Crude - 650 ml + 45.5 ml $H_2O$ - stirred & heated to 170° F.
B="a baggy interface, i.e. poorly defined, erratic, and raggy."

TABLE III

| Demulsifier Chemical Treatments | |
|---|---|
| Treatment* | Chemical Description |
| #1 | Ethoxylated nonyl phenol-formaldehyde + polyacrylic acid ester with polyglycols |
| #2 | Ethoxylated nonyl phenol-formaldehyde + Diester, Diacid polyethers |
| #3 | Ethoxylated nonyl-dinonyl phenol formaldehyde + p-t-amyl phenol-formethoxylate |
| #4 | Nonyl phenol-formaldehyde resin + 70% lauryl (meth) acrylate/ 30% hydroxyethyl (meth) acrylate |
| #5 | Admixture of #2 + polyacrylic acid, esterified w/polyglycol + ethoxyl propoxylate of sorbitol + diacid diester polyether |
| #6 | 2:1 blend of #3 and #5 |
| #7 | A complicated blend of ethoxylated nonyl and t-butyl phenol-formaldehyde resins, butylene and disisopropylene ethoxylates and propoxylates |
| #8 | Ethoxylated phenol-formaldehyde resins (commercially Betz 2W1) |
| #9 | Ethoxylated blended w/solvents (commercially Betz 2W12) |
| #10 | Diester, diacid polyether + nonyl phenol-formaldehyde ethoxylates |

TABLE III-continued

| Demulsifier Chemical Treatments | |
|---|---|
| Treatment* | Chemical Description |
| #11 | Ethoxylated phenol-formaldehyde resins (commercially Betz 2W108) |
| #12 | Nonyl phenol-formaldehyde liquid resin |

*Each of the above demulsifiers are blended in a heavy aromatic naphtha and normally contains from about 25 to about 50 weight percent polymer solids in the formulation.

Demulsifiers

Although improvements in desalter operations would be expected in practicing this invention in the absence of demulsifiers of the type listed above, it is much preferred that the Desalter Control chemicals of this invention be used in the presence of known amounts of commercial demulsifiers. Normal treatment levels of these demulsifiers can range from about 2 to about 1,000 ppm demulsifier polymer solids, based on crude oil treated.

The commercial demulsifiers can include, but are not limited to Nalco 5537, Nalco 5541, Nalco 5547, Nalco 5554, Nalco 5556, Nalco 5590, and the like. These commercial products include one or more of the above identified demulsifier chemicals.

Any material which acts as a demulsifier for crude oil emulsions can be employed as such, either above, or preferably in combination with the nonyl phenol-formaldehyde resins and optionally the lipophilic/hydrophilic vinylic polymers of this invention. In general, a demulsifier, when added to crude oil performs at least one of the following functions:

- Dries oil
- Facilitates hydrocarbon/brine separations
- Coalesces $H_2O$ in crude oil emulsions
- Breaks interface emulsion
- Water disperses and wets/solids
- Strips hydrocarbon from dispersed solids Further examples include a field test held in Canada using the desalter control treatments of this invention. Analysis of solids obtained before and during their tests are described in Table IV.

TABLE IV

| Analysis of Solids | | |
|---|---|---|
| | Dosage PPM | |
| | 0 | 15 |
| Origin of Sample | Desand | Interface |
| Asphaltene, % | 30–50 | None Detected |

Desand

The samples designated "desand" were collected from the bottom of the desalter during a conventional steaming process. This dislodges the solids that had accummulated on the bottom of the desalting vessel. These solids consisted of between 30 to 50% asphaltenes. Upon introducing our asphaltene controlling chemicals the "rag" layer as the interface no longer contained asphaltic components.

Analysis of the amount of solids before and during the test is provided in TABLE V:

TABLE V

Solids At Interface, Sample Point 3

| | Vol. % Solids | Dosage, PPM |
|---|---|---|
| | 6 | 0 |
| | 18 | 0 |
| | 22 | 0 |
| AVERAGE | 15 | |
| | 4 | 15 |
| | ND* | 15 |
| | 3.2 | 15 |
| AVERAGE | 3.6 | |

The data in Tables 4 and 5 clearly shows the effect of the addition of our formulations in regard to cleaning the "rag" layer from the desalter.

This cleaning action was based on the reduction of solids present at the interface. These solids can be bound up with the asphaltic components which tend to form a "rag" layer. The action of our asphaltene dispersing and controlling chemicals was to separate the asphaltenes from these solids. Since these solids are no longer bound to the asphaltenes, they drop through the interface layer much more quickly. This is evident in the above data by the reduced level of solids at the interface as a result of introducing our asphaltene controlling chemicals.

TABLE VI

Settled Desalter Brine Quality

| Oil & Grease MG/L | Solids MG/L | Dosage PPM |
|---|---|---|
| 238 | 68 | None |
| 147 | 56 | None |
| 219 | 168 | None |
| 120 | 344 | None |
| 145 | 250 | None |
| 173.8 | 177.2 | |
| 14 | 18 | 15 |
| 80 | 52 | 15 |
| 47 | 35 | |

Further observations made during these tests were as follows:

The desalter effluent brine was pumped to storage tanks to allow solids and oil accumulated therein to separate. The water phase, after separation, was sampled to determine the amount of oil and grease content, as well as the amount of solids, both before and after treatment with our chemicals. Table VI presents these results. The average oil and grease over a period of approximately 1 month with samples taken about weekly, averaged 173.8 milligrams per liter oil and grease and 177.2 milligrams per liter total solids. Within a week of adding our asphaltene controlling chemicals, the oil and grease average was about 47 milligrams per liter and the total solids average was about 35 milligrams per liter at a dosage of 15 parts per million.

It is therefore, apparent that our asphaltene controlling chemicals promote the separation of hydrocarbons from the brine effluent, even while stored in the settling tankage after the brine effluent has exited the desalter. In addition, it has clearly been shown that the asphaltenes normally present in the "rag" layer have been eliminated or clearly drastically decreased. This leads to a reduction of the amount of dispersed hydrocarbons not only in the brine aqueous layer, but also indicates the possibility of asphaltene dispersion into the hydrocarbon layer meaning more hydrocarbon recovery and less waste exiting the desalter.

In all of the tests outlined above, the chemical mixture used to provide the results is a mixture of the nonyl phenol-formaldehyde resin described earlier. This nonyl phenol-formaldehyde resin has a molecular weight ranging between about 4,000–10,000 and is formed by reacting nonyl phenol and formaldehyde in about 1:1 mole ratio using either an acid or a base catalyst.

This nonyl phenol-formaldehyde product is optionally admixed with the preferred hydrophilic-lipophilic vinylic polymer, which contains 70 weight percent laurylacrylate and 30 weight percent hydroxyethylmethacrylate. The combined mixture of the preferred nonyl phenol-formaldehyde resin and the hydrophilic-lipophilic polymer is at a weight ratio ranging from about 80:20 to about 50:50 nonyl phenol-formaldehyde: laurylacrylate-hydroxethylmethacrylate polymer. In the above tables, a weight ratio of 75:25 nonyl phenol-formaldehyde to lauryl acrylate-hydroxyethylmethacrylate polymer is used, except for treatment in the laboratory with treatment #12, which is only the phenol based resin.

In all cases above, when the high density crude was being treated with the preferred admixture of this invention, at a total dosage of about 5–25 parts per million active polymers based on crude being treated, the hydrocarbon phase exiting the desalter was of excellent quality and could be used for later processing of crude oils. Additionally, the brine effluent phase had those qualities qualities described in Table VI, which qualities were greatly enhanced from those originally obtained with no treatment using our materials. The use of our materials provided for approximately an 80 percent reduction in the amount of solids present at the interface profile samples, and those solids which were still present at the interface during treatment were predominantly free of asphaltenes, brine/brackish inorganic solids composed primarily of iron, calcium, magnesium, and silicate compounds. The dosage of our materials during the field test ranged from approximately 5 parts per million to about 25 parts per million active polymer solids, based on crude oil. During the test period, our dosage averaged approximately 5–10 parts per million. During the test, a demulsifier containing an ethoxylated alkyl phenol resin in combination with other active demulsifiers was also being used. The demulsifier was also present during the blank base-line runs prior to the addition of our asphaltene controlling treatments.

SUMMARY

In summary, the use of asphaltene controlling chemicals containing an alkyl phenol-formaldehyde resin having a molecular weight ranging from about 1,000 to about 20,000 and an alkyl substituent containing from 4 to 24 carbon atoms, which substituent may be linear or branched, when used alone or an admixture with the hydrophilic-lipophilic vinylic polymer having the structure:

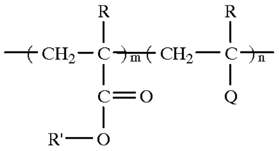

wherein

R is chosen, at each occurrence, from hydrogen and methyl groups; and

R' is a hydrocarbonaceous group containing from 4–24 carbon atoms and chosen from linear or branched alkyl groups, aromatic, cyclic, alkaryl, aralkyl groups, and mixtures thereof; and Q is chosen from the groups,

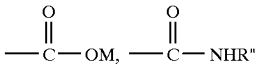

and mixtures thereof; and M is chosen, at each occurrence, from the group hydrogen, alkali metal cations, alkaline earth metal cations, ammonium ions, protonated amines, quaternary amines, hydroxy ethyl, hydroxy propyl and

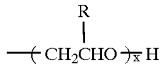

groups, and mixtures thereof; and R" is chosen, at each occurrence, from the group

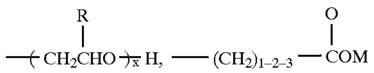

and mixtures thereof; and m and n are both integers of sufficient number to achieve a weight average molecular weight ranging from about 5,000–250,000, and being of such a ratio as to describe the presence of from 90 to 10 weight percent of the lipophilic monomer, m, and from 10 to 90 weight percent of the hydrophilic monomer, n, and wherein x ranges from 1 to 20;

provides enhanced performance in separating water and brines of soluble inorganic salts from crude oil emulsions in an electrostatic desalter. The preferred materials used in treating crude oil emulsions entering the electrostatic desalter include admixtures of the alkyl phenol-formaldehyde liquid resin, preferably nonyl phenol-formaldehyde liquid resin having a molecular weight ranging from 4,000–10,000, optionally with a hydrophilic lipophilic vinylic polymer derived from about 90 to 10 weight percent of a fatty (meth)acrylate ester and from 10 to 90 weight percent of a hydrophilic monomer chosen from the group consisting of (meth)acrylic acid, (meth)acrylic acid salts, (meth)acrylic acid alkoxylate esters, or mixtures thereof.

The hydrophilic lipophilic polymer molecular weight normally ranges from about 5,000 to 250,000, preferably from about 15,000 to about 100,000. The most preferred hydrophilic lipophilic vinylic polymer is a polymer that contains lauryl (meth)acrylate and hydroxyethyl (meth) acrylate, which polymer contains from about 30 to about 80 weight percent lauryl (meth)acrylate.

When used in admixture, the nonyl phenol-formaldehyde liquid resin and the vinylic polymers are admixed in weight ratios ranging from about 90:10 to about 10:90, preferably 80:20 to about 20:80 and most preferably contained vinyl polymers having from 20–90 weight percent lauryl (meth) acrylate and from about 80-10 weight percent hydroxyethyl (meth)acrylate.

The asphaltene controlling chemicals may be used by themselves, but are most preferably used in conjunction with demulsifiers, such as the alkoxylated alkyl phenol-aldehyde resins known in the art.

Having described our invention, we claim:

1. A method for enhanced resolution of crude oil hydrocarbon emulsions, with said crude oil hydrocarbon emulsions being oil-in-water emulsions, containing asphaltenes comprising the steps of:

a) treating the emulsions with from about 1 to about 10,000 parts per million, based on the total amount of the emulsion treated, of an alkyl phenol-formaldehyde polymer having the structure:

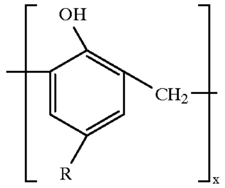

wherein R is a linear or branched alkyl group having from 4–24 carbon atoms; and x is an integer of sufficient number to obtain a weight average molecular weight ranging from about 1,000 to about 20,000; and b) putting the crude oil so treated through an electrostatic desalter, such that a rag interface that forms in the electrostatic desalter is reduced.

2. The method of claim 1, wherein the emulsion is also treated with a second polymer having the structure:

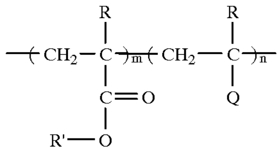

wherein R is independently chosen, at each occurrence, from hydrogen and methyl groups, $R^1$ is a hydrocarbonaceous group having 4–24 carbon atoms and chosen from linear or branched alkyl groups, aromatic, cyclic, alkaryl, aralkyl groups, or mixtures thereof; and Q is independently chosen, at each occurrence, from the groups consisting of

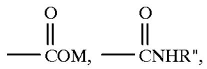

and mixtures thereof; and where: M is chosen from H, $Na^+$, $K^+$, $NH_4^+$, hydroxyethyl groups, hydroxypropyl groups,

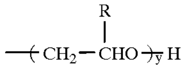

groups, and mixtures thereof; and R" is individually chosen, at each occurrence, from the groups —H,

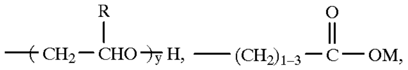

mixtures thereof; and m and n are both integers of sufficient number to provide a weight average molecular weight ranging from 5,000–250,000 and being of such ratio as to provide from 90-10 weight percent lipophilic monomer, m, and from 10–90 weight percent hydrophilic monomer, n and wherein y ranges from 1–20.

3. The method of claim 2, wherein the weight ratio of the phenol-formaldehyde polymer to the second polymer ranges from about 80:20 to about 20:80.

4. The method of claim 1, wherein the phenol-formaldehyde polymer is ratioed to the second polymer such that said ratio, on a weight basis, ranges from about 95:5 to about 5:95.

5. A method for desalting crude oil comprising the steps of:

a) electrocoalescing a crude oil emulsion in an electrostatic desalter whereby a rag interface is formed; and b) reducing the rag interface by adding to the emulsion from about 1 to about 10,000 parts per million, based on the total amount of the emulsion, of an alkyl phenol-formaldehyde polymer having the structure:

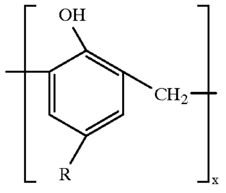

wherein R is a linear or branched alkyl group having from 4–24 carbon atoms; and x is an integer of sufficient number to obtain a weight average molecular weight ranging from about 1,000 to about 20,000.

6. The method of claim 5, wherein a second polymer is added to the emulsion and the second polymer has the structure:

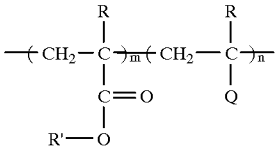

wherein R is independently chosen, at each occurrence, from hydrogen and methyl groups, $R^1$ is a hydrocarbonaceous group having 4–24 carbon atoms and chosen from linear or branched alkyl groups, aromatic, cyclic, alkaryl, aralkyl groups, or mixtures thereof; and Q is independently chosen, at each occurrence, from the groups consisting of

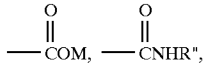

and mixtures thereof; and where: M is chosen from H, $Na^+$, $K^+$, $NH_4^+$, hydroxyethyl groups, hydroxypropyl groups,

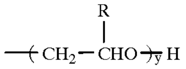

groups, and mixtures thereof; and R" is individually chosen, at each occurrence, from the groups —H,

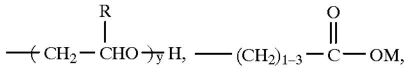

mixtures thereof, and m and n are both integers of sufficient number to provide a weight average molecular weight ranging from 5,000–250,000 and being of such ratio as to provide from 90-10 weight percent lipophilic monomer, m, and from 10–90 weight percent hydrophilic monomer, n and wherein y ranges from 1–20.

7. The method of claim 6, wherein the weight ratio of the phenol-formaldehyde polymer to the second polymer ranges from about 80:20 to about 20:80.

8. The method of claim 5, wherein the phenol-formaldehyde polymer is ratioed to the second polymer such that said ratio, on a weight basis, ranges from about 95:5 to about 5:95.

* * * * *

UNITED STATES PATENT AND TRADEMARK OFFICE
CERTIFICATE OF CORRECTION

PATENT NO. : 6,120,678
DATED : September 19, 2000
INVENTOR(S) : William K. Stephenson, Joe Soctt, Walker, Bordan W. Krupay, and Sheraldean A. Wolsey-Iverson It is certified that error appears in the above-identified patent and that said Letters Patent is hereby corrected as shown below:

On the title page

Assignee: Nalco/Exxon Energy Chemical, L.P.

Signed and Sealed this

First Day of May, 2001

*Attest:*

Nicholas P. Godici

NICHOLAS P. GODICI

*Attesting Officer*

*Acting Director of the United States Patent and Trademark Office*